United States Patent
Lee et al.

(10) Patent No.: US 12,469,882 B2
(45) Date of Patent: Nov. 11, 2025

(54) ADDITIVE, AND LITHIUM SECONDARY BATTERY ELECTROLYTE AND LITHIUM BATTERY WHICH COMPRISE SAME

(71) Applicants: SAMSUNG SDI CO., LTD., Yongin-si (KR); SOGANG UNIVERSITY RESEARCH & BUSINESS DEVELOPMENT FOUNDATION, Seoul (KR)

(72) Inventors: Tae Jin Lee, Yongin-si (KR); Bongjin Moon, Seoul (KR); Youngchan Bang, Seoul (KR); Wonseok Cho, Yongin-si (KR); Soojin Kim, Yongin-si (KR); Sanghoon Kim, Yongin-si (KR); Injun Park, Yongin-si (KR); Myungheui Woo, Yongin-si (KR); Junyong Lee, Yongin-si (KR); Hyejeong Jeong, Yongin-si (KR)

(73) Assignees: Samsung SDI Co., Ltd., Yongin-si (KR); Sogang University Research & Business Development Foundation, Seoul (KR)

( * ) Notice: Subject to any disclaimer, the term of this patent is extended or adjusted under 35 U.S.C. 154(b) by 499 days.

(21) Appl. No.: 18/003,679

(22) PCT Filed: Dec. 6, 2021

(86) PCT No.: PCT/KR2021/018321
§ 371 (c)(1),
(2) Date: Dec. 28, 2022

(87) PCT Pub. No.: WO2022/158702
PCT Pub. Date: Jul. 28, 2022

(65) Prior Publication Data
US 2023/0318033 A1    Oct. 5, 2023

(30) Foreign Application Priority Data
Jan. 21, 2021   (KR) .................. 10-2021-0008873

(51) Int. Cl.
| | |
|---|---|
| *H01M 10/0567* | (2010.01) |
| *C07C 323/52* | (2006.01) |
| *C08G 75/16* | (2006.01) |
| *H01M 4/525* | (2010.01) |
| *H01M 10/0569* | (2010.01) |
| *H01M 4/02* | (2006.01) |

(52) U.S. Cl.
CPC ....... *H01M 10/0567* (2013.01); *C07C 323/52* (2013.01); *C08G 75/16* (2013.01); *H01M 4/525* (2013.01); *H01M 10/0569* (2013.01); *H01M 2004/028* (2013.01); *H01M 2300/004* (2013.01)

(58) Field of Classification Search
CPC ............ H01M 10/0567; H01M 4/525; H01M 10/0569; H01M 2004/028; H01M 2300/004; H01M 10/0525; H01M 2300/0025; H01M 10/052; C07C 323/52; C08G 75/16; C08G 75/14; Y02E 60/10
See application file for complete search history.

(56) References Cited

U.S. PATENT DOCUMENTS

2017/0141442 A1    5/2017   Mikhaylik et al.

FOREIGN PATENT DOCUMENTS

| JP | 55128591 A | * | 10/1980 | |
|---|---|---|---|---|
| JP | 2004-55471 A | | 2/2004 | |
| JP | 2004055471 A | * | 2/2004 | |
| JP | 2010-135165 A | | 6/2010 | |
| JP | 2020027695 A | * | 2/2020 | |
| KR | 10-2014-0001693 A | | 1/2014 | |
| KR | 10-2018-0071377 A | | 6/2018 | |
| WO | WO-2016205407 A1 | * | 12/2016 | ............ H01M 4/602 |
| WO | WO-2020032378 A1 | * | 2/2020 | ........ H01M 10/0566 |

OTHER PUBLICATIONS

Korean Office Action dated Feb. 21, 2025, issued in Korean Patent Application No. 10-2021-0008873, 7 pages.
Wang, et al., "L-cystine additive in the negative electrolyte of vanadium redox flow battery for improving electrochemical performance", Ionics, 2019, vol. 25, pp. 221-229.
Torii, et al., "Electrosynthesis of heteroatom-heteroatom bonds. 4. Direct cross-coupling of dialkyl (or diaryl) phosphites with disulfides by a sodium bromide promoted electrolytic procedure", The Journal of Organic Chemistry, 1979, vol. 44, No. 16, pp. 2938-2941.
International Search Report of PCT/KR2021/018321, Mar. 14, 2022, 4 pp.

* cited by examiner

*Primary Examiner* — Muhammad S Siddiquee
(74) *Attorney, Agent, or Firm* — Womble Bond Dickinson (US) LLP (57) ABSTRACT

Provided are an additive represented by Chemical Formula 1, an electrolyte for a lithium secondary battery including the same, and a lithium secondary battery.
The details of Chemical Formula 1 are as set forth in the specification.

12 Claims, 5 Drawing Sheets

ADDITIVE, AND LITHIUM SECONDARY BATTERY ELECTROLYTE AND LITHIUM BATTERY WHICH COMPRISE SAME

CROSS-REFERENCE TO RELATED APPLICATIONS

This application is a U.S. National Phase Patent Application of International Application Number PCT/KR2021/018321, filed on Dec. 6, 2021, which claims priority of Korean Patent Application Number 10-2021-0008873, filed on Jan. 21, 2021, the entire content of each of which is incorporated herein by reference.

TECHNICAL FIELD

This disclosure relates to an additive, an electrolyte for a lithium secondary battery and a lithium secondary battery which comprise same.

BACKGROUND ART

A lithium secondary battery may be recharged and has three or more times as high energy density per unit weight as a conventional lead storage battery, nickel-cadmium battery, nickel hydrogen battery, nickel zinc battery and the like. It may be also charged at a high rate and thus, is commercially manufactured for a laptop, a cell phone, an electric tool, an electric bike, and the like, and researches on improvement of additional energy density have been actively made.

Such a lithium secondary battery is manufactured by injecting an electrolyte into a battery cell, which includes a positive electrode including a positive electrode active material capable of intercalating/deintercalating lithium ions and a negative electrode including a negative electrode active material capable of intercalating/deintercalating lithium ions.

Particularly, the electrolyte uses an organic solvent in which a lithium salt is dissolved, and such an electrolyte is important in determining stability and performance of a lithium secondary battery.

$LiPF_6$, which is most commonly used as a lithium salt of the electrolyte, has a problem of accelerating the depletion of the solvent and generating a large amount of gas by reacting with the organic solvent of the electrolyte. When $LiPF_6$ decomposes, LiF and $PF_5$ are produced, which causes electrolyte depletion in the battery, resulting in high-temperature performance degradation and poor safety.

Accordingly, there is a demand for an electrolyte having improved safety without deteriorating performance even under long-term charge and discharge conditions and/or high-temperature conditions.

DISCLOSURE

Technical Problem

An embodiment provides an additive with improved stability even under long-term charge and discharge conditions and/or high-temperature conditions Another embodiment provides a lithium secondary battery with improved cycle-life characteristics, high-temperature safety, and high-temperature reliability by applying the additive.

Another embodiment is to provide a lithium secondary battery including the electrolyte for the lithium secondary battery.

Technical Solution

An embodiment of the present invention provides an additive represented by Chemical Formula 1.

[Chemical Formula 1]

In Chemical Formula 1, $X^1$ and $X^2$ are each independently O or S, $L^1$ and $L^2$ are each independently O, S, or a substituted or unsubstituted C1 to C10 alkylene group, $R^1$ to $R^4$ are each independently hydrogen, a halogen, a substituted or unsubstituted C1 to C10 alkyl group, a substituted or unsubstituted C1 to C10 alkoxy group, a substituted or unsubstituted C1 to C10 acyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group, $Y^1$ and $Y^2$ are each independently a substituted or unsubstituted C1 to C10 alkyl group, a substituted or unsubstituted C1 to C10 alkoxy group, a substituted or unsubstituted C1 to C10 acyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group, and n and m are each independently one of integers ranging from 1 to 20.

For example, $L^1$ and $L^2$ may each independently be O or S.

For example, $Y^1$ and $Y^2$ may each independently be a substituted or unsubstituted C1 to C10 alkyl group, a substituted or unsubstituted C1 to C10 alkoxy group, a substituted or unsubstituted C1 to C10 acyl group, a substituted or unsubstituted C2 to C10 alkenyl group, a substituted or unsubstituted C2 to C10 alkynyl group, or a substituted or unsubstituted C6 to C20 aryl group.

As a specific example, $Y^1$ and $Y^2$ may each independently be a substituted or unsubstituted C1 to C10 alkyl group, a substituted or unsubstituted C1 to C10 alkoxy group, a substituted or unsubstituted C1 to C10 acyl group, or a substituted or unsubstituted C6 to C20 aryl group.

For example, $Y^1$ and $Y^2$ may each independently be a substituted or unsubstituted C1 to C10 alkyl group, a substituted or unsubstituted C1 to C10 alkoxy group, or a substituted or unsubstituted C1 to C10 acyl group.

For example, n and m may each independently be one of integers ranging from 1 to 10.

In an embodiment of the present invention, Chemical Formula 1 may be represented by Chemical Formula 1A.

[Chemical Formula 1A]

In Chemical Formula 1A, $Y^1$, $Y^2$, $R^1$ to $R^4$, n, and m are the same as described above.

Another embodiment of the present invention provides an electrolyte for lithium secondary battery including a non-aqueous organic solvent, a lithium salt, and the aforementioned additive.

The additive may be included in an amount of 0.1 wt % to 5 wt % based on the total weight of the electrolyte for the lithium secondary battery.

Another embodiment of the present invention provides a lithium secondary battery including a positive electrode including a positive electrode active material; a negative electrode including a negative electrode active material; and the aforementioned electrolyte.

The positive electrode active material may be a lithium composite oxide represented by Chemical Formula 5.

[Chemical Formula 5]

In Chemical Formula 5,
$0.5 \leq x \leq 1.8$, $0 < y \leq 1$, $0 \leq z \leq 1$, $0 \leq y+z \leq 1$, and $M^1$, $M^2$, and $M^3$ may each independently be any one selected from a metal such as Ni, Co, Mn, Al, Sr, Mg or La, and a combination thereof.

For example, the positive electrode active material may be a lithium composite oxide represented by Chemical Formula 5-1 or Chemical Formula 5-2.

[Chemical Formula 5-1]

In Chemical Formula 5-1,
$1 \leq x1 \leq 1.2$, $0 < y1 < 1$, and $0 < z1 < 1$, and

[Chemical Formula 5-2]

wherein, in Chemical Formula 5-2,
$1 \leq x2 \leq 1.2$, $0 < y2 < 1$, and $0 < z2 < 1$.

Advantageous Effects

By applying the additive with improved safety, it is possible to implement a lithium secondary battery capable of suppressing an increase in internal resistance and suppressing a voltage drop after long-term charging/discharging or being left at a high temperature to improve cycle-life characteristics and high-temperature storage characteristics.

DESCRIPTION OF SYMBOLS

100: lithium secondary battery
112: negative electrode
113: separator
114: positive electrode
120: battery case
140: sealing member

MODE FOR INVENTION

Hereinafter, a lithium secondary battery according to an embodiment of the present invention will be described in detail with reference to the accompanying drawings. However, these embodiments are exemplary, the present invention is not limited thereto and the present invention is defined by the scope of claims.

In the present specification, unless otherwise defined, "substituted" means that at least one hydrogen in a substituent or compound is deuterium, a halogen group, a hydroxyl group, an amino group, a substituted or unsubstituted C1 to C30 amine group, a nitro group, a substituted or unsubstituted C1 to C40 silyl group, a C1 to C30 alkyl group, a C1 to C10 alkylsilyl group, a C6 to C30 arylsilyl group, a C3 to C30 cycloalkyl group, a C3 to C30 heterocycloalkyl group, a C6 to C30 aryl group, a C2 to C30 heteroaryl group, a C1 to C20 alkoxy group, a C1 to C10 fluoroalkyl group, a cyano group, or a combination thereof.

In one example of the present invention, "substituted" refers to replacement of at least one hydrogen of a substituent or a compound by deuterium, a halogen, a C1 to C30 alkyl group, a C1 to C10 alkylsilyl group, a C6 to C30 arylsilyl group, a C3 to C30 cycloalkyl group, a C3 to C30 heterocycloalkyl group, a C6 to C30 aryl group, a C2 to C30 heteroaryl group, a C1 to C10 fluoroalkyl group, or a cyano group. In addition, in specific examples of the present invention, "substituted" refers to replacement of at least on hydrogen of a substituent or a compound by deuterium, a halogen, a C1 to C20 alkyl group, a C6 to C30 aryl group, a C1 to C10 fluoroalkyl group, or a cyano group. In addition, in specific examples of the present invention, "substituted" refers to replacement of at least one hydrogen of a substituent or a compound by deuterium, a halogen, a C1 to C5 alkyl group, a C6 to C18 aryl group, a C1 to C5 fluoroalkyl group, or a cyano group. In addition, in specific examples of the present invention, "substituted" refers to replacement of at least one hydrogen of a substituent or a compound by deuterium, a cyano group, a halogen, a methyl group, an ethyl group, a propyl group, a butyl group, a phenyl group, a biphenyl group, a terphenyl group, a trifluoromethyl group, or a naphthyl group.

A lithium secondary battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Figure 1:
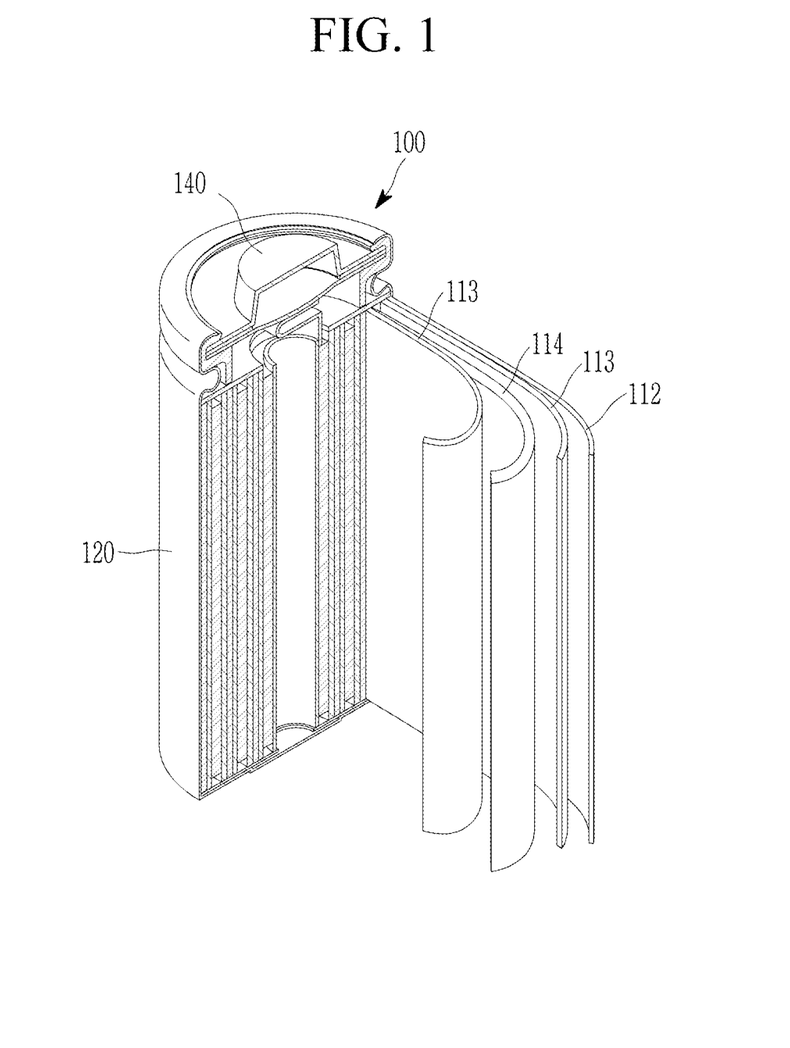
FIG. 1 is a schematic view showing a lithium secondary battery according to an embodiment of the present invention.

Herein, as an example of a lithium secondary battery, a cylindrical lithium secondary battery is for example described. FIG. 1 schematically illustrates the structure of a lithium secondary battery according to an embodiment.

Referring to FIG. 1, a lithium secondary battery 100 according to an embodiment includes a battery cell including a positive electrode 114, a negative electrode 112 facing the positive electrode 114, a separator 113 between the positive electrode 114 and the negative electrode 112, and an electrolyte (not shown) impregnating the positive electrode 114, negative electrode 112, and separator 113, a battery case 120 housing the battery cell, and a sealing member 140 sealing the battery case 120.

Hereinafter, an additive according to an embodiment will be described.

An additive according to an embodiment of the present invention is represented by Chemical Formula 1.

[Chemical Formula 1]

In Chemical Formula 1, $X^1$ and $X^2$ are each independently O or S, $L^1$ and $L^2$ are each independently O, S, or a substituted or unsubstituted C1 to C10 alkylene group, $R^1$ to $R^4$ are each independently hydrogen, a halogen, a substituted or unsubstituted C1 to C10 alkyl group, a substituted or unsubstituted C1 to C10 alkoxy group, a substituted or unsubstituted C1 to C10 acyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group, and $Y^1$ and $Y^2$ are each independently a substituted or unsubstituted C1 to C10 alkyl group, a substituted or unsubstituted C1 to C10 alkoxy group, a substituted or unsubstituted C1 to C10 acyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group, and n and m are each independently one of integers ranging from 1 to 20.

The additive according to an embodiment of the present invention has a structure that a biscarbonyl-based or bisthiocarbonyl-based compound is linked by a disulfide linker.

This compound may be decomposed into two moieties with the disulfide linker in the center.

These form each film respectively on the surfaces of the positive and negative electrodes and thus may suppress a resistance increase in the films, during the long-term charge/discharge or the high-temperature storage and improve stability of the films and resultantly, have an effect of improving cycle-life characteristics, high-temperature cycle-life, and thermal safety characteristics.

For example, $L^1$ and $L^2$ may each independently be O or S.

For example, $Y^1$ and $Y^2$ may each independently be a substituted or unsubstituted C1 to C10 alkyl group, a substituted or unsubstituted C1 to C10 alkoxy group, a substituted or unsubstituted C1 to C10 acyl group, a substituted or unsubstituted C2 to C10 alkenyl group, a substituted or unsubstituted C2 to C10 alkynyl group or a substituted or unsubstituted C6 to C20 aryl group.

As a specific example, $Y^1$ and $Y^2$ may each independently be a substituted or unsubstituted C1 to C10 alkyl group, a substituted or unsubstituted C1 to C10 alkoxy group, a substituted or unsubstituted C1 to C10 acyl group, or a substituted or unsubstituted C6 to C20 aryl group.

For example, $Y^1$ and $Y^2$ may each independently be a substituted or unsubstituted C1 to C10 alkyl group, a substituted or unsubstituted C1 to C10 alkoxy group, or a substituted or unsubstituted C1 to C10 acyl group.

For example, n and m may each independently be one of integers ranging from 1 to 10.

According to an embodiment of the present invention, Chemical Formula 1 may be represented by Chemical Formula 1A.

[Chemical Formula 1A]

In Chemical Formula 1A, $Y^1$, $Y^2$, $R^1$ to $R^4$, n, and m are the same as described above.

An electrolyte for a lithium secondary battery according to another embodiment of the present invention includes a non-aqueous organic solvent, a lithium salt, and the aforementioned additive.

The additive may be included in an amount of 0.1 wt % to 5.0 wt %, for example, 0.1 wt % to 3.0 wt %, based on the total weight of the electrolyte for the lithium secondary battery.

When the content range of the additive is as described above, a lithium secondary battery having improved cycle-life characteristics and high-temperature storage characteristics may be implemented by preventing an increase in resistance during long-term charge/discharge or at high temperatures.

That is, when the content of the additive is less than 0.1 wt %, high-temperature storage properties may be deteriorated, and when it exceeds 5.0 wt %, cycle-life may be deteriorated due to an increase in interface resistance.

The non-aqueous organic solvent serves as a medium for transmitting ions taking part in the electrochemical reaction of a battery.

The non-aqueous organic solvent serves as a medium for transmitting ions taking part in the electrochemical reaction of a battery.

The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may be methyl acetate, ethyl acetate, n-propyl acetate, t-butyl acetate, methyl propionate, ethyl propionate, propyl propionate, decanolide, mevalonolactone, caprolactone, and the like. The ether-based solvent may be dibutyl ether, tetraglyme, diglyme, dimethoxyethane, 2-methyltetrahydrofuran, tetrahydrofuran, and the like. In addition, the ketone-based solvent may be cyclohexanone, and the like. The alcohol- based solvent may include ethanol, isopropyl alcohol, and the like, and the aprotic solvent may include nitriles such as R—CN (wherein R is a hydrocarbon group having a C2 to C20 linear, branched, or cyclic structure and may include a double bond, an aromatic ring, or an ether bond), and the like, amides such as dimethyl formamide, and the like, dioxolanes such as 1,3-dioxolane, and the like, sulfolanes, and the like.

The non-aqueous organic solvent may be used alone or in a mixture, and when used in a mixture, the mixing ratio may be appropriately adjusted in accordance with a desired battery performance, which is widely understood by those skilled in the art.

The carbonate-based solvent is prepared by mixing a cyclic carbonate and a chain carbonate. When the cyclic carbonate and chain carbonate are mixed together in a volume ratio of 1:1 to 1:9, a performance of the electrolyte may be improved.

The non-aqueous organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 3.

[Chemical Formula 3]

In Chemical Formula 3, $R^{201}$ to $R^{206}$ are the same or different and are hydrogen, a halogen, a C1 to C10 alkyl group, a haloalkyl group, or a combination thereof.

Specific examples of the aromatic hydrocarbon-based organic solvent may be benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include vinylene carbonate, vinyl ethylene carbonate, or an ethylene carbonate-based compound represented by Chemical Formula 4 as an additive to improve cycle-life of a battery.

[Chemical Formula 4]

In Chemical Formula 4, $R^{207}$ and $R^{208}$ are the same or different, and are selected from hydrogen, a halogen, a cyano group (CN), a nitro group ($NO_2$), and a fluorinated C1 to C5 alkyl group, provided that at least one of $R^{207}$ and $R^{208}$ is selected from a halogen, a cyano group (CN), a nitro group ($NO_2$), and a fluorinated C1 to C5 alkyl group, and both $R^{207}$ and $R^{208}$ are not hydrogen.

Examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. When such an additive for improving cycle-life is further used, its amount may be appropriately adjusted.

The lithium salt dissolved in the non-organic solvent supplies lithium ions in a battery, enables a basic operation of a lithium secondary battery, and improves transportation of the lithium ions between positive and negative electrodes. Examples of the lithium salt may include at least one selected from $LiPF_6$, $LiBF_4$, LiDFOP, LiDFOB, $LiPO_2F_2$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example an integer of 1 to 20), LiCl, LiI, and LiB $(C_2O_4)_2$ (lithium bis(oxalato) borate: LiBOB). The lithium salt may be used in a concentration ranging from 0.1 M to 2.0 M. When the lithium salt is included at the above concentration range, an electrolyte may have excellent performance and lithium ion mobility due to optimal electrolyte conductivity and viscosity.

Another embodiment of the present invention provides a lithium secondary battery including a positive electrode including a positive electrode active material; a negative electrode including a negative electrode active material; and the aforementioned electrolyte.

The positive electrode includes a positive electrode current collector and a positive electrode active material layer on the positive electrode current collector, and the positive electrode active material layer includes a positive electrode active material.

The positive electrode active material may include lithiated intercalation compounds that reversibly intercalate and deintercalate lithium ions.

Specifically, at least one of a composite oxide of a metal selected from cobalt, manganese, nickel, and a combination thereof and lithium may be used.

Of course, one having a coating layer on the surface of the lithium composite oxide may be used, or a mixture of the composite oxide and a compound having a coating layer may be used. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating process may include any conventional processes as long as it does not cause any side effects on the properties of the positive electrode active material (e.g., inkjet coating, dipping), which is well known to persons having ordinary skill in this art, so a detailed description thereof is omitted.

The positive electrode active material may be, for example, at least one of lithium composite oxides represented by Chemical Formula 5.

$$Li_xM^1_yM^2_zM^3_{1-y-z}O_2$$ [Chemical Formula 5]

In Chemical Formula 5, $0.5 \le x \le 1.8$, $0 < y \le 1$, $0 \le z \le 1$, $0 \le y+z \le 1$, and $M^1$, $M^2$, and $M^3$ may each independently be any one selected from a metal such as Ni, Co, Mn, Al, Sr, Mg or La, and a combination thereof.

In an embodiment, $M^1$ and $M^2$ may each independently be Ni or Co, and $M^3$ may be a metal such as Co, Mn, Al, Sr, Mg, or La.

In a specific embodiment, $M^1$ and $M^2$ may each independently be Ni or Co, and $M^3$ may each independently Mn or Al, but is not limited thereto.

In a more specific embodiment, the positive electrode active material may be a lithium composite oxide represented by Chemical Formula 5-1 or Chemical Formula 5-2.

$$Li_{x1}Ni_{y1}Co_{z1}Al_{1-y1-z1}O_2$$ [Chemical Formula 5-1]

In Chemical Formula 5-1, $1 \le x1 \le 1.2$, $0 < y1 < 1$, and $0 < z1 < 1$, $$Li_{x2}Ni_{y2}Co_{z2}Mn_{1-y2-z2}O_2$$ [Chemical Formula 5-2]

In Chemical Formula 5-2, $1 \le x2 \le 1.2$, $0 < y2 < 1$, and $0 < z2 < 1$.

For example, in Chemical Formula 5-1, $1 \le x1 \le 1.2$, $0.5 \le y1 < 1$, and $0 < z1 \le 0$.

As a specific example, in Chemical Formula 5-1, $1 \le x1 \le 1.2$, $0.6 \le y1 < 1$, and $0 < z1 \le 0.5$.

As a more specific example, in Chemical Formula 5-1, $1 \le x1 \le 1.2$, $0.7 \le y1 < 1$, and $0 < z1 \le 0.5$.

For example, in Chemical Formula 5-1, $1 \le x1 \le 1.2$, $0.8 \le y1 < 1$, and $0 < z1 \le 0.5$.

For example, in Chemical Formula 5-2, $1 \le x2 \le 1.2$, $0.3 \le y2 < 1$, and $0.3 \le z2 < 1$.

As a specific example, in Chemical Formula 5-2, $1 \le x2 \le 1.2$, $0.6 \le y2 < 1$, and $0.3 \le z2 < 1$.

As a more specific example, in Chemical Formula 5-2, $1 \le x2 \le 1.2$, $0.7 \le y2 < 1$, and $0.3 \le z2 < 1$.

For example, as a specific example, in Chemical Formula 5-2, $1 \le x2 \le 1.2$, $0.8 \le y2 < 1$, and $0.3 \le z2 < 1$.

A content of the positive electrode active material may be 90 wt % to 98 wt % based on the total weight of the positive electrode active material layer.

In an embodiment of the present invention, the positive electrode active material layer may optionally include a conductive material and a binder. In this case, a content of the conductive material and the binder may be 1.0 wt % to 5.0 wt %, respectively, based on the total weight of the positive electrode active material layer.

The conductive material is included to impart conductivity to the positive electrode and any electrically conductive material may be used as a conductive material unless it causes a chemical change in the configured battery. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The binder improves binding properties of positive electrode active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The positive electrode current collector may include Al, but is not limited thereto.

The negative electrode includes a negative electrode current collector and a negative electrode active material layer including a negative electrode active material formed on the negative electrode current collector.

The negative electrode active material may include a material that reversibly intercalates/deintercalates lithium ions, a lithium metal, a lithium metal alloy, a material capable of doping/dedoping lithium, or transition metal oxide. The material that reversibly intercalates/deintercalates lithium ions includes carbon materials. The carbon material may be any generally-used carbon-based negative electrode active material in a lithium secondary battery and examples of the carbon material include crystalline carbon, amorphous carbon, and a combination thereof. The crystalline carbon may be non-shaped, or sheet, flake, spherical, or fiber shaped natural graphite or artificial graphite and the amorphous carbon may be a soft carbon, a hard carbon, a mesophase pitch carbonization product, calcined coke, and the like.

The lithium metal alloy may include lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be Si, Si—C composite, $SiO_x$ ($0<x<2$), a Si-Q alloy wherein Q is an element selected from an alkali metal, an alkaline-earth metal, a Group 13 element, a Group 14 element, a Group 15 element, a Group 16 element, a transition metal, a rare earth element, and a combination thereof, but not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Sn), and the like. At least one of these materials may be mixed with $SiO_2$.

The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be a vanadium oxide, a lithium vanadium oxide, and the like.

In a specific embodiment, the negative electrode active material may be a Si—C composite including a Si-based active material and a carbon-based active material.

An average particle diameter of the Si-based active material in the Si—C composite may be 50 nm to 200 nm.

When the average particle diameter of the Si-based active material is within the above range, volume expansion occurring during charging and discharging may be suppressed, and a break in a conductive path due to particle crushing during charging and discharging may be prevented.

The Si-based active material may be included in an amount of 1 wt % to 60 wt %, for example, 3 wt % to 60 wt % based on the total weight of the Si—C composite.

In another specific embodiment, the negative electrode active material may further include crystalline carbon together with the aforementioned Si—C composite.

When the negative electrode active material includes a Si—C composite and crystalline carbon together, the Si—C composite and crystalline carbon may be included in the form of a mixture, and in this case, the Si—C composite and crystalline carbon may be included in a weight ratio of 1:99 to 50:50. More specifically, the Si—C composite and crystalline carbon may be included in a weight ratio of 5:95 to 20:80.

The crystalline carbon may include, for example, graphite, and more specifically, natural graphite, artificial graphite, or a mixture thereof.

An average particle diameter of the crystalline carbon may be 5 μm to 30 μm.

In the present specification, an average particle diameter may be a particle size (D50) at a volume ratio of 50% in a cumulative size-distribution curve.

The Si—C composite may further include a shell surrounding a surface of the Si—C composite, and the shell may include amorphous carbon.

The amorphous carbon may include soft carbon, hard carbon, a mesophase pitch carbonized product, calcined coke, or a mixture thereof.

The amorphous carbon may be included in an amount of 1 to 50 parts by weight, for example, 5 to 50 parts by weight, or 10 to 50 parts by weight based on 100 parts by weight of the carbon-based active material.

In the negative electrode active material layer, the negative electrode active material may be included in an amount of 95 wt % to 99 wt % based on the total weight of the negative electrode active material layer.

In an embodiment, the negative electrode active material layer may include a binder, and optionally a conductive material. The content of the binder in the negative electrode active material layer may be 1 wt % to 5 wt % based on the total weight of the negative electrode active material layer. In addition, when the conductive material is further included, 90 wt % to 98 wt % of the negative electrode active material, 1 wt % to 5 wt % of the binder, and 1 wt % to 5 wt % of the conductive material may be used.

The binder improves binding properties of negative electrode active material particles with one another and with a current collector. The binder may be a non-water-soluble binder, a water-soluble binder, or a combination thereof.

The non-water-soluble binder may be polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, ethylenepropyleneco polymer, polyethylene oxide, polyvinylpyrrolidone, polyepichlorohydrin, polyphosphazene, polyacrylonitrile, polystyrene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

When the water-soluble binder is used as a negative electrode binder, a cellulose-based compound may be further used to provide viscosity as a thickener. The cellulose-based compound includes one or more of carboxymethyl cellulose, hydroxypropylmethyl cellulose, methyl cellulose, or alkali metal salts thereof. The alkali metal may be Na, K, or Li. Such a thickener may be included in an amount of 0.1 parts by weight to 3 parts by weight based on 100 parts by weight of the negative electrode active material.

The conductive material is included to improve electrode conductivity and any electrically conductive material may be used as a conductive material unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The negative electrode current collector may be selected from a copper foil, a nickel foil, a stainless-steel foil, a titanium foil, a nickel foam, a copper foam, a polymer substrate coated with a conductive metal, and a combination thereof.

The lithium secondary battery may further include a separator between the negative electrode and the positive electrode, depending on a type of the battery. Such a separator may be a porous substrate or a composite porous substrate.

The porous substrate may be a substrate including pores, and lithium ions may move through the pores. The porous substrate may for example include polyethylene, polypropylene, polyvinylidene fluoride, and multi-layers thereof such as a polyethylene/polypropylene double-layered separator, a polyethylene/polypropylene/polyethylene triple-layered separator, and polypropylene/polyethylene/polypropylene triple-layered separator.

The composite porous substrate may have a form including a porous substrate and a functional layer on the porous substrate. The functional layer may be, for example, at least one of a heat-resistant layer and an adhesive layer from the viewpoint of enabling additional function. For example, the heat-resistant layer may include a heat-resistant resin and optionally a filler.

In addition, the adhesive layer may include an adhesive resin and optionally a filler.

The filler may be an organic filler or an inorganic filler.

Referring to FIG. 1, a lithium secondary battery 100 according to an embodiment includes a battery cell including a negative electrode 112, a positive electrode 114 facing the negative electrode 112, a separator 113 interposed between the negative electrode 112 and the positive electrode 114, and an electrolyte (not shown) for a lithium secondary battery impregnating the negative electrode 112, the positive electrode 114, and the separator 113, a battery case 120 housing the battery cell, and a sealing member 140 sealing the battery case 120.

DETAILED DESCRIPTION OF THE EMBODIMENTS

Hereinafter, examples of the present invention and comparative examples are described. These examples, however, are not in any sense to be interpreted as limiting the scope of the invention.

Synthesis of Additives

Synthesis Example: Synthesis of Compound (1)

[Reaction Scheme 1]

85%

Dithioglycolic acid methyl ester (1.0 eq) was dissolved in 100 ml of methanol, and 0.5 mL of sulfuric acid was added thereto. The reaction mixture was stirred at room temperature for about 12 hours. When a reaction was completed, the reaction mixture was extracted with EA and then, several times washed with water to remove the methanol. An organic layer collected therefrom was dried with $MgSO_4$ and filtered, and a filtrate therefrom was concentrated and purified through column chromatography by using EA as an eluent (yield amount: 8.766 g, yield: 85%).

1H NMR (400 MHZ, CDCl3): δ 3.77 (s, 6H), 3.59 (s, 4H); 13C NMR (400 MHz, CDCl3): δ 169.99, 52.81, 41.29

Manufacture of Lithium Secondary Battery Cells

Example 1

$LiNi_{0.88}Co_{0.07}Al_{0.02}O_2$ as a positive electrode active material, polyvinylidene fluoride as a binder, and ketjen black as a conductive material were mixed in a weight ratio of 97:2:1 and then, dispersed in N-methyl pyrrolidone, preparing positive electrode active material slurry.

The positive electrode active material slurry was coated on a 14 μm-thick Al foil, dried at 110° C., and pressed, manufacturing a positive electrode.

A negative electrode active material prepared by mixing artificial graphite and an Si—C composite in a weight ratio of 93:7, a styrene-butadiene rubber binder, and carboxylmethyl cellulose were mixed in a weight ratio of 97:1:2 and then, dispersed in distilled water, preparing negative electrode active material slurry.

The Si—C composite included a core including artificial graphite and silicon particles and coal-based pitch coated on the surface of the core.

The negative electrode active material slurry was coated on a 10 μm-thick Cu and then, dried at 100° C. and pressed, manufacturing a negative electrode.

The positive electrode and the negative electrode were assembled with a 25 μm-thick polyethylene separator to manufacture an electrode assembly, and an electrolyte was injected thereinto, manufacturing a lithium secondary battery cell.

The electrolyte had a composition as follows.
(Composition of Electrolyte)
Salt: 1.5 M $LiPF_6$
Solvent: ethylene carbonate:ethylmethyl carbonate:dimethyl carbonate (EC:EMC:DMC=a volume ratio of 20:10:70)
Additive: 0.1 wt % of Compound (1) according to the synthesis example
(in the composition of the electrolyte, "wt %" is based on the total content of electrolyte (lithium salt+non-aqueous organic solvent+additive))

Example 2

A lithium secondary battery was manufactured in the same manner as in Example 1, except that 2.0 wt % of the Compound (1) was added as an additive.

Example 3

A lithium secondary battery was manufactured in the same manner as in Example 1, except that 5.0 wt % of the Compound (1) was added as an additive.

Comparative Example 1

A lithium secondary battery was manufactured in the same manner as in Example 1, except for using an electrolyte without additives.

Evaluation 1: Evaluation of Room-Temperature Charge/Discharge Cycle Characteristics The lithium secondary battery cells according to Examples 1 to 3 and Comparative Example 1 were respectively charged and discharged under the following conditions and then, evaluated with respect to cycle characteristics, and the results are shown in FIG. 4.

Figure 2:
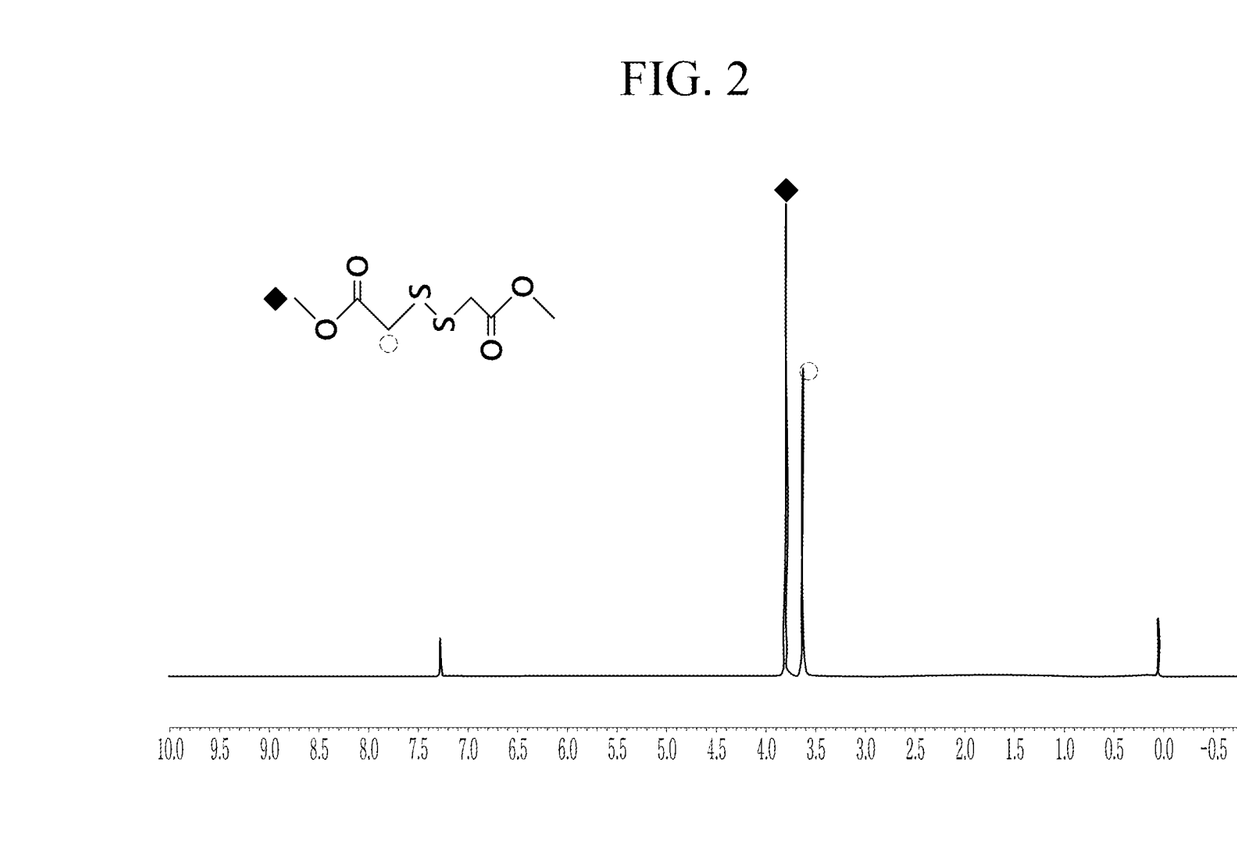
FIG. 2 is a 1H NMR spectrum of an additive according to an embodiment.
Figure 3:
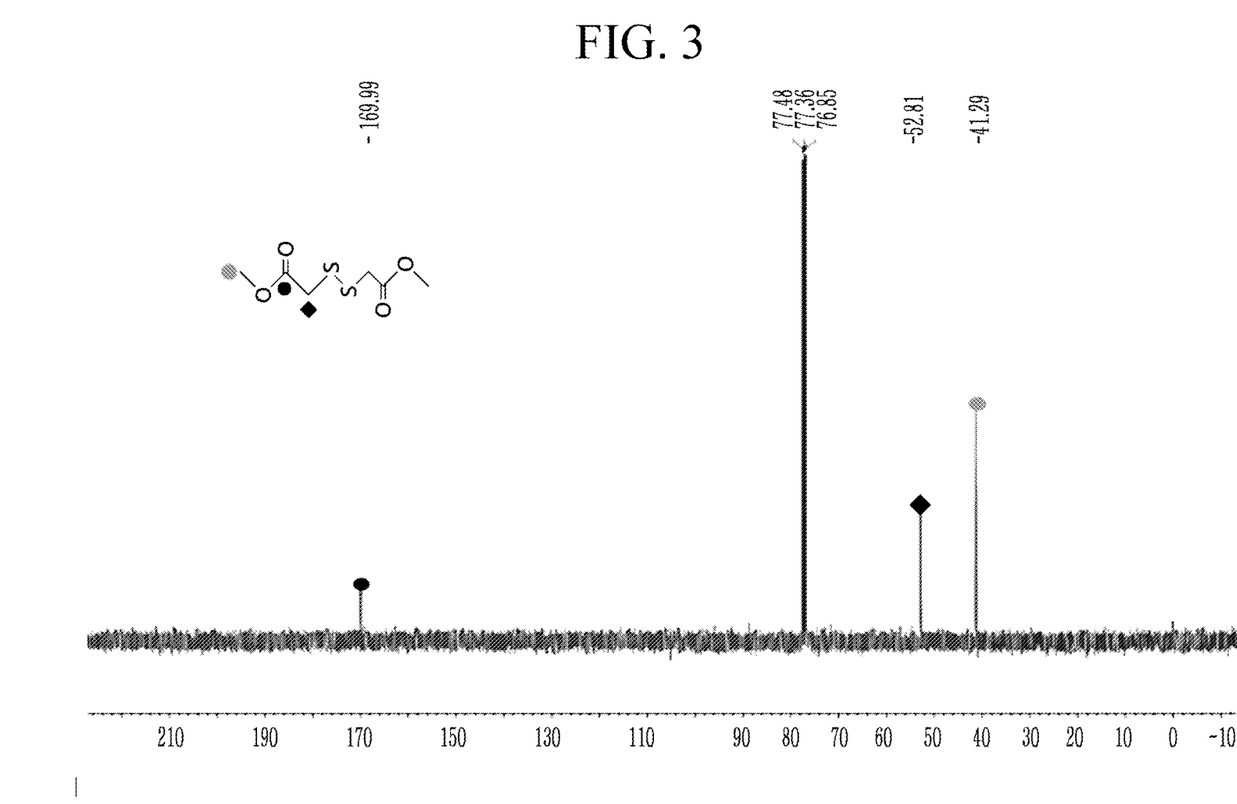
FIG. 3 is a 13C NMR spectrum of an additive according to an embodiment.

While 250 cycles charged and discharged within 2.5 V to 4.2 V at a 0.5 C C-rate at 25° C., the cells were estimated with respect to changes in discharge capacity and changes in DC internal resistance (DC-IR), and the results are shown in FIG. 2.

Figure 4:
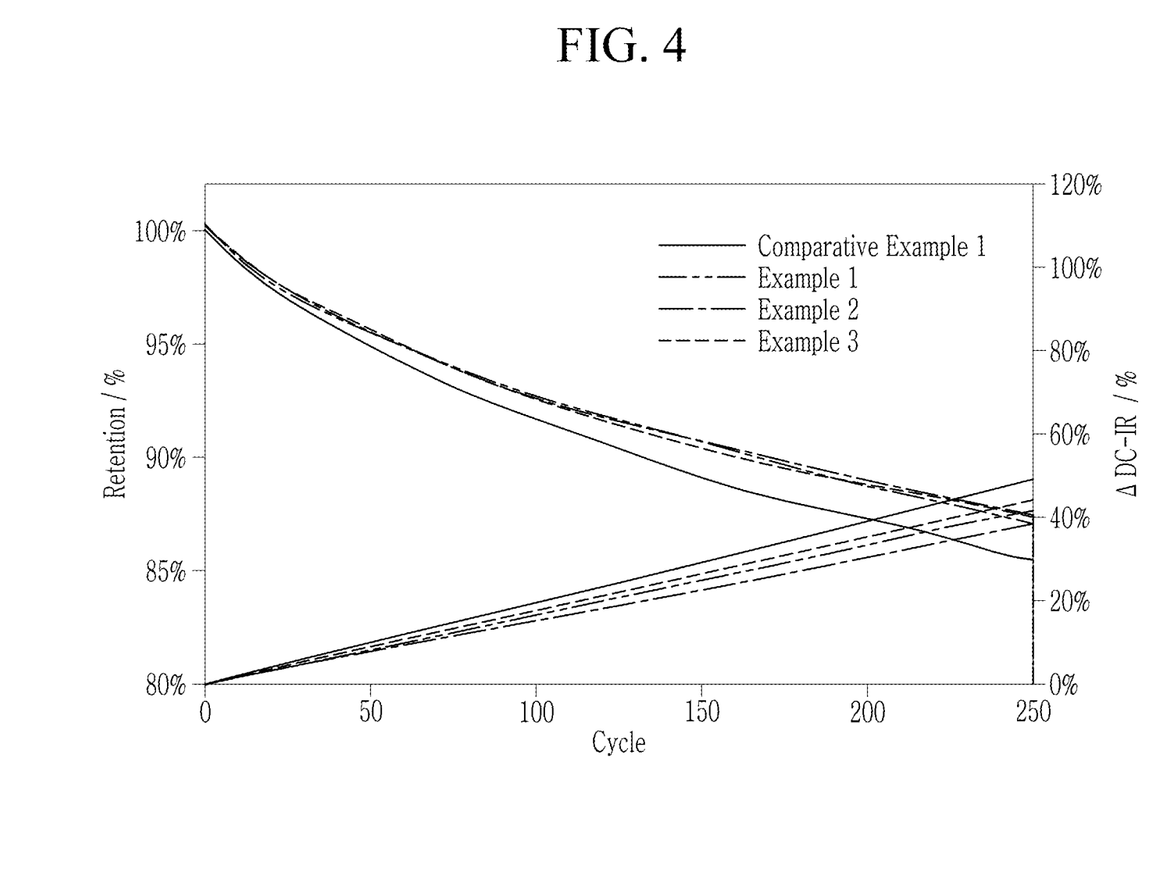
FIG. 4 is a graph showing room-temperature charge/discharge cycle characteristics of the lithium secondary battery cells according to Examples 1 to 3 and Comparative Example 1.

FIG. 4 is a graph showing room-temperature charge/discharge cycle characteristics of the lithium secondary battery cells according to Examples 1 to 3 and Comparative Example 1.

Referring to FIG. 4, Examples 1 to 3, compared with Comparative Example 1, exhibited excellent cycle-life characteristics and in addition, a lower internal resistance increase rate and thus improved internal resistance characteristics.

Evaluation 2: Evaluation of High-Temperature Storage Characteristics

Figure 5:
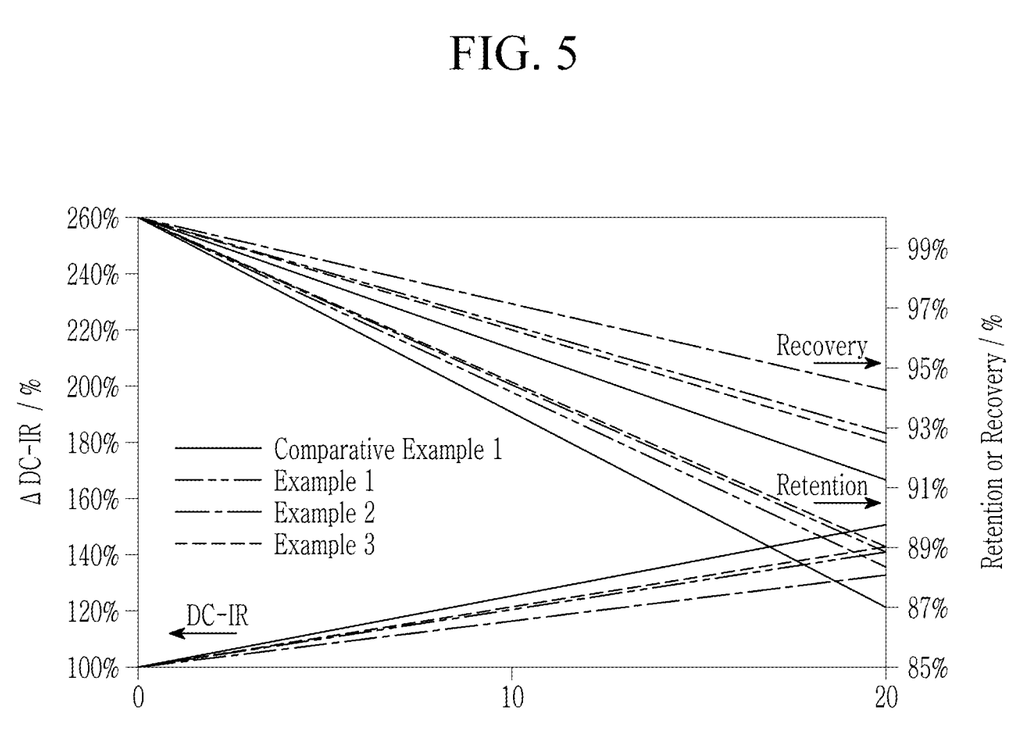
FIG. 5 is a graph showing a resistance increase rate and a capacity recovery rate of the battery measured after the lithium secondary batteries according to Examples 1 to 3 and Comparative Example 1 were left at 60° C. for 20 days.

The lithium secondary battery cells according to Examples 1 to 3 and Comparative Example 1 were stored under the following condition and then, measured with respect to internal resistance and capacity retention, and the results are shown in FIG. 5.

After stored at a high temperature at 60° C. for every 10 days, the cells were measured with respect to DC-IR (direct current internal resistance) at SOC 50 under a discharge condition of a 0.5 C rate.

In addition, each of the lithium secondary battery cells according to Examples 1 to 3 and Comparative Example 1 was measured with respect to discharge capacity. Subsequently, after stored at a high temperature (60° C.) for every 10 days, the cells were twice charged and discharged at 0.2 C and twice measured with respect to discharge capacity. A ratio of the discharge capacity after the storage at a high temperature to the discharge capacity before the storage at a high temperature was calculated, wherein the first discharge capacity was expressed as capacity retention and the second discharge capacity was expressed as recovery capacity.

FIG. 5 is a graph showing a resistance increase rate and a capacity recovery rate of the battery measured after the lithium secondary batteries according to Examples 1 to 3 and Comparative Example 1 were left at 60° C. for 20 days.

Referring to FIG. 5, Example 1 to 3 exhibited excellent storage characteristics at a high temperature, compared with Comparative Example 1.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. An additive represented by Chemical Formula 1:

[Chemical Formula 1]

Wherein, in Chemical Formula 1, $X^1$ and $X^2$ are each independently O or S, and $L^1$ and $L^2$ are each independently O, S, or a substituted or unsubstituted C1 to C10 alkylene group, $R^1$ to $R^4$ are each independently hydrogen, a halogen, a substituted or unsubstituted C1 to C10 alkyl group, a substituted or unsubstituted C1 to C10 alkoxy group, a substituted or unsubstituted C1 to C10 acyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group, $Y^1$ and $Y^2$ are each independently a substituted or unsubstituted C1 to C10 alkyl group, a substituted or unsubstituted C1 to C10 alkoxy group, a substituted or unsubstituted C1 to C10 acyl group, a substituted or unsubstituted C2 to C10 alkenyl group, a substituted or unsubstituted C3 to C10 cycloalkyl group, a substituted or unsubstituted C3 to C10 cycloalkenyl group, a substituted or unsubstituted C2 to C10 alkynyl group, a substituted or unsubstituted C3 to C10 cycloalkynyl group, or a substituted or unsubstituted C6 to C20 aryl group, and n and m are each independently one of integers ranging from 1 to 20.

2. The additive of claim 1, wherein
$L^1$ and $L^2$ are each independently O or S.

3. The additive of claim 1, wherein
$Y^1$ and $Y^2$ are each independently a substituted or unsubstituted C1 to C10 alkyl group, a substituted or unsubstituted C1 to C10 alkoxy group, a substituted or unsubstituted C1 to C10 acyl group, a substituted or unsubstituted C2 to C10 alkenyl group, a substituted or unsubstituted C2 to C10 alkynyl group, or a substituted or unsubstituted C6 to C20 aryl group.

4. The additive of claim 1, wherein
$Y^1$ and $Y^2$ are each independently a substituted or unsubstituted C1 to C10 alkyl group, a substituted or unsubstituted C1 to C10 alkoxy group, a substituted or unsubstituted C1 to C10 acyl group, or a substituted or unsubstituted C6 to C20 aryl group.

5. The additive of claim 1, wherein
$Y^1$ and $Y^2$ are each independently a substituted or unsubstituted C1 to C10 alkyl group, a substituted or unsubstituted C1 to C10 alkoxy group, or a substituted or unsubstituted C1 to C10 acyl group.

6. The additive of claim 1, wherein
n and m are each independently one of integers ranging from 1 to 10.

7. The additive of claim 1, wherein
Chemical Formula 1 is represented by Chemical Formula 1A:

[Chemical Formula 1A]

wherein, in Chemical Formula 1A,
$Y^1$, $Y^2$, $R^1$ to $R^4$, n, and m are as defined in claim 1.

8. An electrolyte for a lithium secondary battery, comprising
a non-aqueous organic solvent,
a lithium salt, and
the additive of claim 1.

9. The electrolyte of claim 8, wherein
the additive is included in an amount of 0.1 wt % to 5.0 wt % based on the total weight of the electrolyte for the lithium secondary battery.

10. A lithium secondary battery comprising
a positive electrode including a positive electrode active material;
a negative electrode including a negative electrode active material; and
the electrolyte for the lithium secondary battery of claim 8.

11. The lithium secondary battery of claim 10, wherein
the positive electrode active material is represented by Chemical Formula 5:

$$Li_xM^1_yM^2_zM^3_{1-y-z}O_2$$ [Chemical Formula 5]

wherein, in Chemical Formula 5,
$0.5 \leq x \leq 1.8$, $0 < y \leq 1$, $0 \leq z \leq 1$, $0 \leq y+z \leq 1$, and $M^1$, $M^2$, and $M^3$ are each independently any one selected from a metal of Ni, Co, Mn, Al, Sr, Mg, or La, and a combination thereof.

12. The lithium secondary battery of claim 10, wherein
the positive electrode active material is a lithium composite oxide represented by Chemical Formula 5-1 or Chemical Formula 5-2:

$$Li_{x1}Ni_{y1}Co_{z1}Al_{1-y1-z1}O_2$$ [Chemical Formula 5-1]

wherein, in Chemical Formula 5-1,
$1 \leq x1 \leq 1.2$, $0 < y1 < 1$, and $0 < z1 < 1$, and $$Li_{x2}Ni_{y2}CO_{z2}Mn_{1-y2-z2}O_2$$ [Chemical Formula 5-2]

wherein, in Chemical Formula 5-2,
$1 \leq x2 \leq 1.2$, $0 < y2 < 1$, and $0 < z2 < 1$.

* * * * *